(12) United States Patent
Mattocks

(10) Patent No.: US 7,392,996 B2
(45) Date of Patent: Jul. 1, 2008

(54) APPARATUS FOR ESTABLISHING A CASTER ANGLE OF A VEHICLE SUSPENSION SYSTEM

(75) Inventor: William Mattocks, Springfield, MO (US)

(73) Assignee: Ridewell Corporation, Springfield, MO (US)

( * ) Notice: Subject to any disclaimer, the term of this patent is extended or adjusted under 35 U.S.C. 154(b) by 360 days.

(21) Appl. No.: 11/110,502

(22) Filed: Apr. 20, 2005

(65) Prior Publication Data

US 2006/0237919 A1 Oct. 26, 2006

(51) Int. Cl.
*B62D 17/00* (2006.01)
(52) U.S. Cl. .................. 280/86.751; 280/5.521; 267/64.12
(58) Field of Classification Search ............ 280/5.52, 280/5.521, 86.75, 86.751; 267/64.11–64.13
See application file for complete search history.

(56) References Cited

U.S. PATENT DOCUMENTS

| | | | | |
|---|---|---|---|---|
| 4,973,070 | A | * | 11/1990 | Menichini et al. ......... 280/5.521 |
| 5,015,004 | A | * | 5/1991 | Mitchell ................... 280/81.6 |
| 5,018,756 | A | * | 5/1991 | Mitchell ................... 280/81.6 |
| 5,403,031 | A | * | 4/1995 | Gottschalk et al. ......... 280/86.5 |
| 5,816,605 | A | * | 10/1998 | Raidel, Sr. .................. 280/676 |
| 5,836,233 | A | * | 11/1998 | Rumsey ........................ 92/63 |
| 6,007,078 | A | | 12/1999 | Gottschalk et al. |
| 6,182,984 | B1 | * | 2/2001 | Chalin .................... 280/86.751 |
| 6,293,570 | B1 | * | 9/2001 | Gottschalk et al. ...... 280/86.751 |
| 6,796,566 | B2 | * | 9/2004 | VanDenberg ............... 280/86.5 |
| 6,880,839 | B2 | * | 4/2005 | Keeler et al. ............... 280/86.5 |
| 2003/0107198 | A1 | | 6/2003 | Vandenberg |
| 2007/0013229 | A1 | * | 1/2007 | Plantan et al. ........... 303/115.1 |
| 2007/0063580 | A1 | * | 3/2007 | Scheckelhoff et al. ... 303/115.1 |

OTHER PUBLICATIONS

Initial Publication with Search Report dated Aug. 29, 2006 of PCT/US2006/014792.
International Preliminary Report dated Oct. 23, 2007 for PCT/US2006/014792.
Written Opinion of the International Searching Authority for PCT/US2006/014792.

* cited by examiner

*Primary Examiner*—Christopher Bottorff
*Assistant Examiner*—Drew J. Brown
(74) *Attorney, Agent, or Firm*—Lathrop & Gage L.C.

(57) ABSTRACT

Provided is an apparatus for establishing a caster angle of a vehicle suspension system. The apparatus includes two air reservoirs, each reservoir having an extendable piston rod. The air reservoirs are juxtaposed, and are pivotally connected to a single bell crank. In particular, the bell crank is pivotally connected to each piston rod, and to a control arm of the vehicle suspension system for establishing the caster angle. Concerted pressurizing and exhausting of the air reservoirs extends and retracts the piston rods, causing the bell crank to rotate. Rotation of the bell crank induces movement of the control arm which translates into a rotation of an axle to a desired caster angle. In one embodiment, one air reservoir is a multi-chamber reservoir capable of doubling the force used to extend the piston rod, rotate the bell crank and adjust the caster angle.

19 Claims, 4 Drawing Sheets

APPARATUS FOR ESTABLISHING A CASTER ANGLE OF A VEHICLE SUSPENSION SYSTEM

BACKGROUND

Large vehicles such as semi-trailer trucks and tractors often include or require a steerable suspension system. A steerable suspension system often improves the maneuverability of the vehicle by reducing its turning radius and providing a mechanism for the vehicle to maneuver around tight corners, for example by making small adjustments in the alignment of the vehicle wheels. In many instances, the steerable suspension system includes one or more auxiliary axles to enhance greater control over vehicle movement.

The term "steerable" suggests an ability to establish and maintain a desired caster angle of an axle, relative for example to an axis substantially perpendicular to the contact or driving surface of the vehicle. In particular, it is desirable to set the caster angle of an axle such that the wheels attached to the axle will not laterally deflect under self-energizing friction forces. Suspension systems known in the art provide a mechanism for establishing and maintaining a "positive" caster angle when the vehicle moves forward. Positive caster is a setting where the steering axis is inclined rearward at the top, as viewed from the side. Positive caster makes possible the self-centering force that tends to return the wheel to the direction the vehicle is traveling. Typically, a positive caster angle is on the order of five degrees.

An interesting problem arises, however, when a vehicle travels in a reverse direction to back up. Many prior art systems simply "lock" the caster angle/suspension system in the forward, or positive caster, position, thereby making it impossible for the wheels to move laterally as the vehicle travels in reverse. While effective at preventing lateral movement of the wheels, this approach reduces the overall maneuverability of the vehicle and eliminates advantages recognized with a steerable suspension system.

Other systems known in the art provide a mechanism for changing or reversing the caster angle by as much as five to ten degrees, thereby establishing a "negative" caster angle. By reversing the caster angle, the wheels accommodate the backward movement of the vehicle without lateral movement. Known systems for establishing both a positive and a negative caster angle are typically very complex, for example including multiple pivot arms and linkages coupled through a plurality of pivot points. These systems often require a plurality of air chambers and air bellows, and combinations thereof.

Structurally, the suspension systems known in the art require air chambers, air bellows or other actuation mechanisms that are positioned opposite one another. As can be appreciated, opposing components of the size and complexity of an air chamber or air bellows occupy a relatively large physical space in the suspension system. If the size of an air chamber or bellows is minimized for packaging purposes, often the mechanical force provided to rotate and maintain the caster angle is inadequate.

SUMMARY

An apparatus for establishing a caster angle of a vehicle suspension system is provided. In particular, and by way of example only, according to one embodiment, provided is an apparatus for establishing a caster angle of a vehicle suspension system comprising: a bell crank pivotally connected to a control arm of an axle subassembly; a first air reservoir coupled to the bell crank; and a second air reservoir coupled to the bell crank wherein the first and the second air reservoirs are concertedly pressurized and exhausted to rotate the bell crank, and wherein rotation of the bell crank induces movement of the control arm to establish the caster angle.

Also, in one embodiment, provided is an apparatus for establishing a caster angle of a vehicle suspension system comprising: an axle subassembly having an axle; at least one hanger bracket interconnecting the axle subassembly to a chassis of the vehicle; a bell crank; a control arm having a first end pivotally connected to the bell crank and a second end connected to the axle subassembly; a first air reservoir having a first piston rod pivotally connected to the bell crank; and a second air reservoir having a second piston rod pivotally connected to the bell crank, wherein concerted pressurizing and exhausting of the first and the second air reservoirs induces a corresponding extension and retraction of the first and second piston rods to rotate the bell crank, and wherein rotation of the bell crank induces a corresponding movement of the control arm and axle to establish the caster angle.

Further, in one embodiment a method is provided for establishing a caster angle of a vehicle suspension system, comprising: pressurizing and exhausting a first air reservoir to extend and retract, respectively, a first piston rod having a first end positioned within the first air reservoir and a second end pivotally attached to a bell crank; and pressurizing and exhausting a second air reservoir, in concert with the first air reservoir, to extend and retract, respectively, a second piston rod having a first end positioned within the second air reservoir and a second end pivotally attached to the bell crank, wherein concertedly pressurizing and exhausting the first and the second air reservoirs induces a rotation of the bell crank, and a subsequent rotation of an axle of the vehicle suspension system to establish the caster angle.

DETAILED DESCRIPTION

Figure 1:
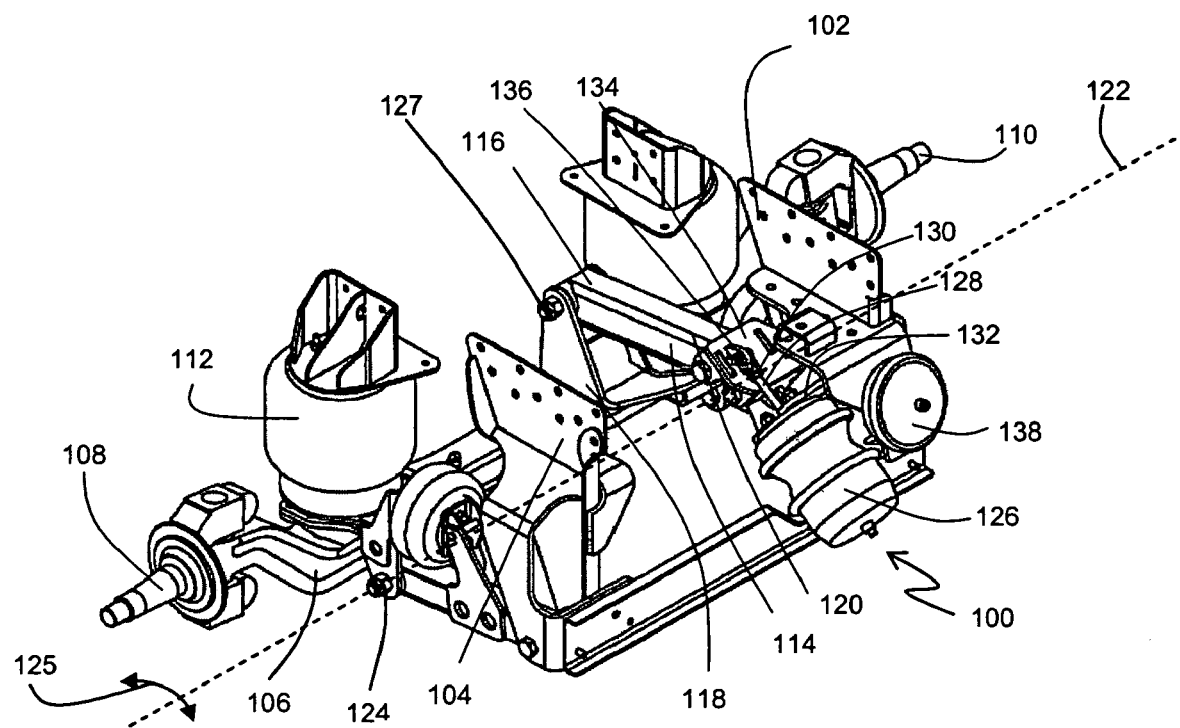
FIG. 1 is a perspective view of an axle subassembly including a dual reservoir bell crank caster adjuster, according to an embodiment.

An apparatus 100 for establishing a caster angle of a vehicle suspension system is shown in FIG. 1. The apparatus 100 is connected to an axle subassembly 102 of the vehicle suspension system. Axle subassembly 102 includes one or more hanger brackets, of which hanger bracket 104 is exemplary. Further, axle subassembly 102 includes an axle 106 having one or more spindles, e.g., spindles 108 and 110. Axle subassembly 102 may also include at least one air bellows 112, as are typically found in vehicle suspension systems of this type.

As shown, axle subassembly 102 also includes a control arm 114 connected at one end 116 to an axle connector bracket 118. A second end 120 of control arm 114 pivotally connects to apparatus 100 as discussed in detail below. When induced to move, axle connector bracket 118 rotates about an axis of rotation 122 at pivot point 124. Given the interconnection of axle connector bracket 118 and axle 106, as more clearly shown in FIGS. 2–4, axle 106 moves concurrent with the rotation of axle connector bracket 118, thereby changing the caster angle of axle subassembly 102. As shown in FIG. 1 by arrow 125, axle connector bracket 118, and hence axle 106, may rotate in either a clockwise or counterclockwise direction. Axle connector bracket 118, and hence axle 106, are induced to rotate by apparatus 100 as discussed in detail below.

Still referring to FIG. 1, apparatus 100 includes an air reservoir 126 having a piston rod 128. Piston rod 128 has an end 130 extending beyond an outer surface 132 of air reservoir 126 and connecting to a bell crank 134. In particular, piston rod 128 pivotally connects to bell crank 134 at pivot point 136. Apparatus 100 also includes an air reservoir 138. Air reservoir 138 pivotally connects to bell crank 134 in a manner similar to air reservoir 126, i.e. via a piston rod 200, FIG. 2.

Figure 2:
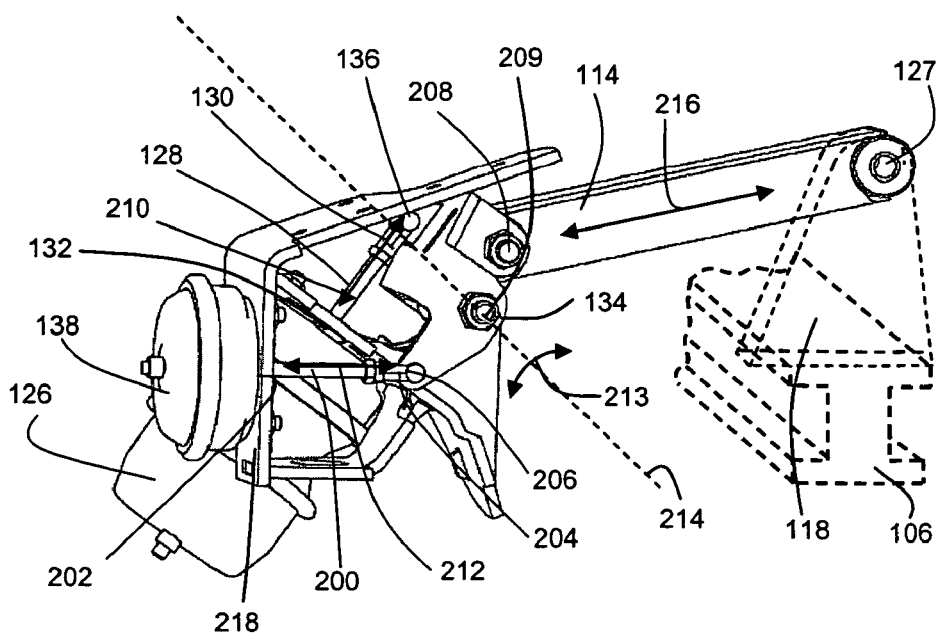
FIG. 2 is a perspective view of a dual reservoir bell crank caster adjuster, according to an embodiment.

The interrelationship of air reservoir 126, air reservoir 138, bell crank 134 and control arm 114 is more clearly depicted in FIG. 2. For example, the connection of air reservoir 138 to bell crank 134 is shown. Specifically, piston rod 200 extends from an outer surface 202 of air reservoir 138 generally toward bell crank 134. An end 204 of piston rod 200 pivotally connects to bell crank 134 at pivot point 206.

In addition to piston rod 200, the connection of piston rod 128 to bell crank 134 is also shown in FIG. 2. Specifically, end 130 of piston rod 128 connects to bell crank 134 at pivot point 136, and bell crank 134 pivotally connects to control arm 114 at pivot point 208. As discussed above, control arm 114 also connects to axle connector bracket 118 (shown in phantom) at point 127.

As can be appreciated by referring to FIG. 2, piston rod 128 may extend and retract relative to outer surface 132, as indicated by arrow 210. Piston rod 128 thus moves toward and away from bell crank 134 along an axis generally represented by arrow 210. Similarly, piston rod 200 can extend and retract, relative to outer surface 202, as indicated by arrow 212. The concerted extension or retraction of piston rods 128 and 200 induces a rotation of bell crank 134 about an axis 214 through hanger bracket pivot point 209, as shown by arrow 213. Accordingly, rotation of bell crank 134 induces movement of control arm 114, in the directions represented by arrow 216. Further, axle connector bracket 118 rotates about axis 122, FIG. 1, in response to the movement of control arm 114. It is the rotation of axle connector bracket 118, which connects to axle 106 (shown in phantom in FIG. 2), that establishes a caster angle for axle subassembly 102.

The use of a bell crank 134 connected to one or more piston rods 128, 200 facilitates an efficient packaging of air reservoir 126 and air reservoir 138 as part of the overall axle subassembly 102. In particular, air reservoirs 126 and 138 are juxtaposed, as opposed to being opposite one another as commonly found in current systems. Advantageously, closer positioning, or tighter packaging, of reservoirs 126, 138 may reduce the number and size of mounting brackets (e.g. bracket 218) as opposed to the prior art. Further, the positioning of reservoirs 126 and 138 facilitates the interconnection of a pressurized fluid source (not shown) to the reservoirs 126, 138.

Figure 3:
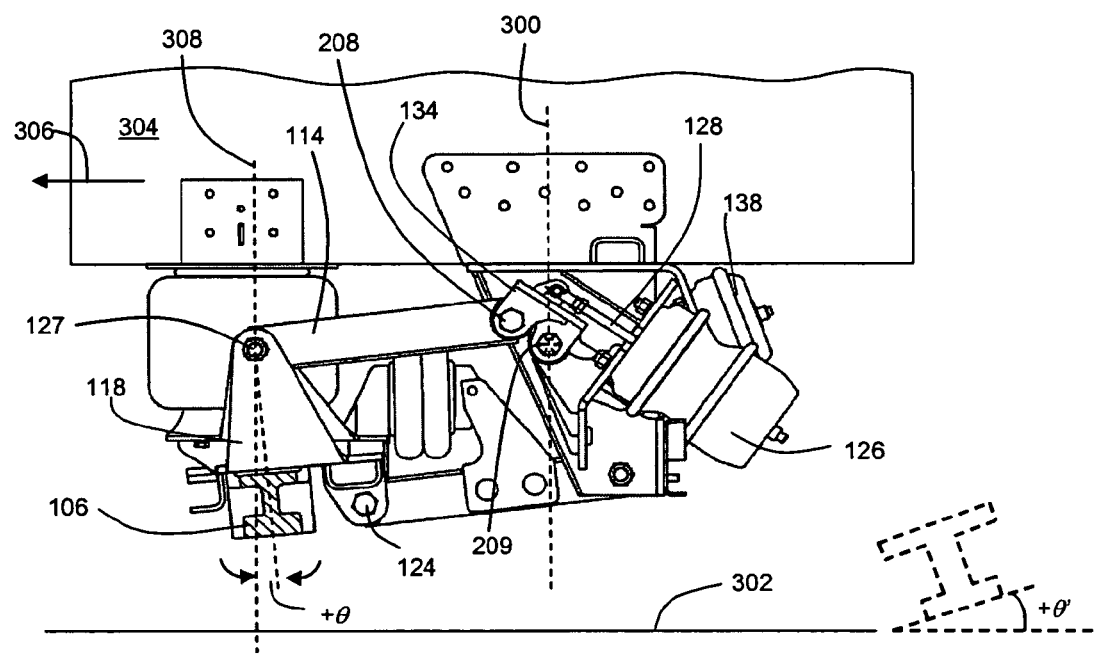
FIG. 3 is side view of an axle subassembly having a positive caster angle established by a dual reservoir bell crank caster adjuster, according to an embodiment.
Figure 4:
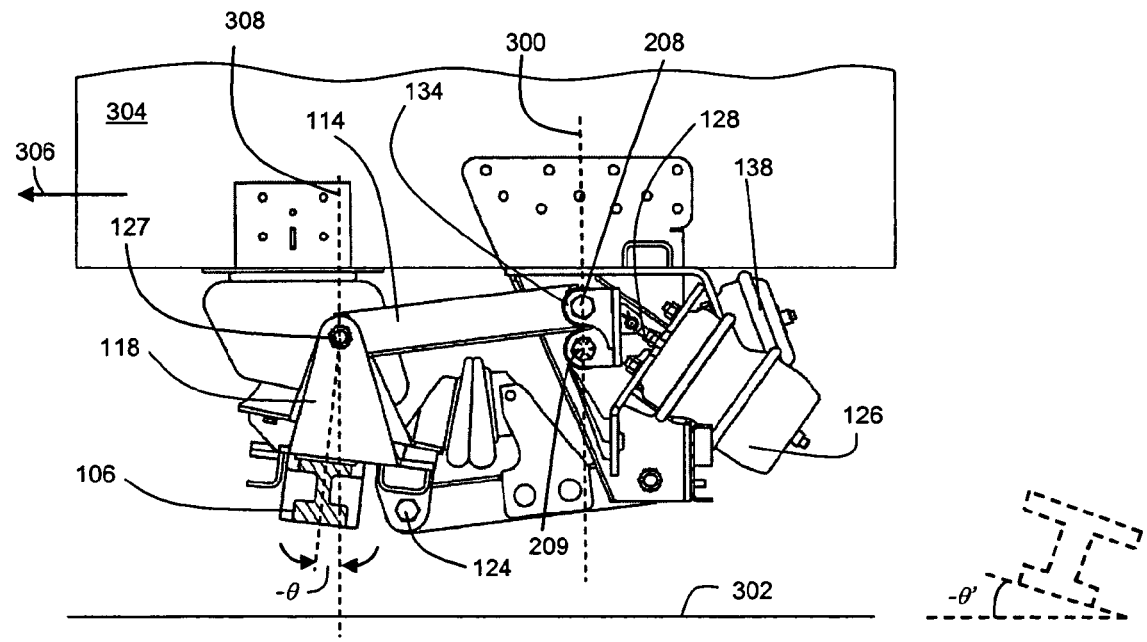
FIG. 4 is side view of an axle subassembly having a negative caster angle established by a dual reservoir bell crank caster adjuster, according to an embodiment.

The relationship between the extension and retraction of the piston rods 128 and 200, the rotation of bell crank 134, the movement of control arm 114, and the establishment of a caster angle is shown in FIGS. 3 and 4. Referring first to FIG. 3, a positive caster angle is established. As shown, extension of piston rod 128 with subsequent retraction of piston rod 200 (not shown in FIG. 3) results in rotation of control arm pivot point 208 on bell crank 134 in a "rearward" direction (rearward of an axis 300 drawn through pivot point 209). As shown, axis 300 is substantially perpendicular to a contact or driving surface 302 of a vehicle 304. Bell crank 134 thus rotates toward the rearward end (represented by arrow 306) of vehicle 304. Rearward rotation of bell crank 134 "pushes" on control arm 114 and rotates axle connector bracket 118 about pivot point 124. Rotation of axle connector bracket 118 establishes a positive caster angle "+θ", relative to an axis 308 drawn through point 127, substantially perpendicular to contact or travel surface 302. The positive caster angle established may also be represented as an angle between the axle 106 and the contact surface 302, shown in phantom as "+θ'" in FIG. 3.

Alternatively, as shown in FIG. 4, retraction of piston rod 128 and extension of piston rod 200 (not shown in FIG. 4), rotates control arm pivot point 208 on bell crank 134 in a "forward" direction relative to the rearward end 306 of vehicle 304. Control arm pivot point 208 thus rotates toward axis 300 about pivot point 209. This movement of bell crank 134 "pulls" control arm 114 forward, thereby rotating axle connector bracket 118 and establishing a negative caster angle "−θ", relative to axis 308. As shown in phantom in FIG. 4, the negative caster angle may also be represented as an angle between axle 106 and contact surface 302, i.e. "−θ'".

Figure 5:
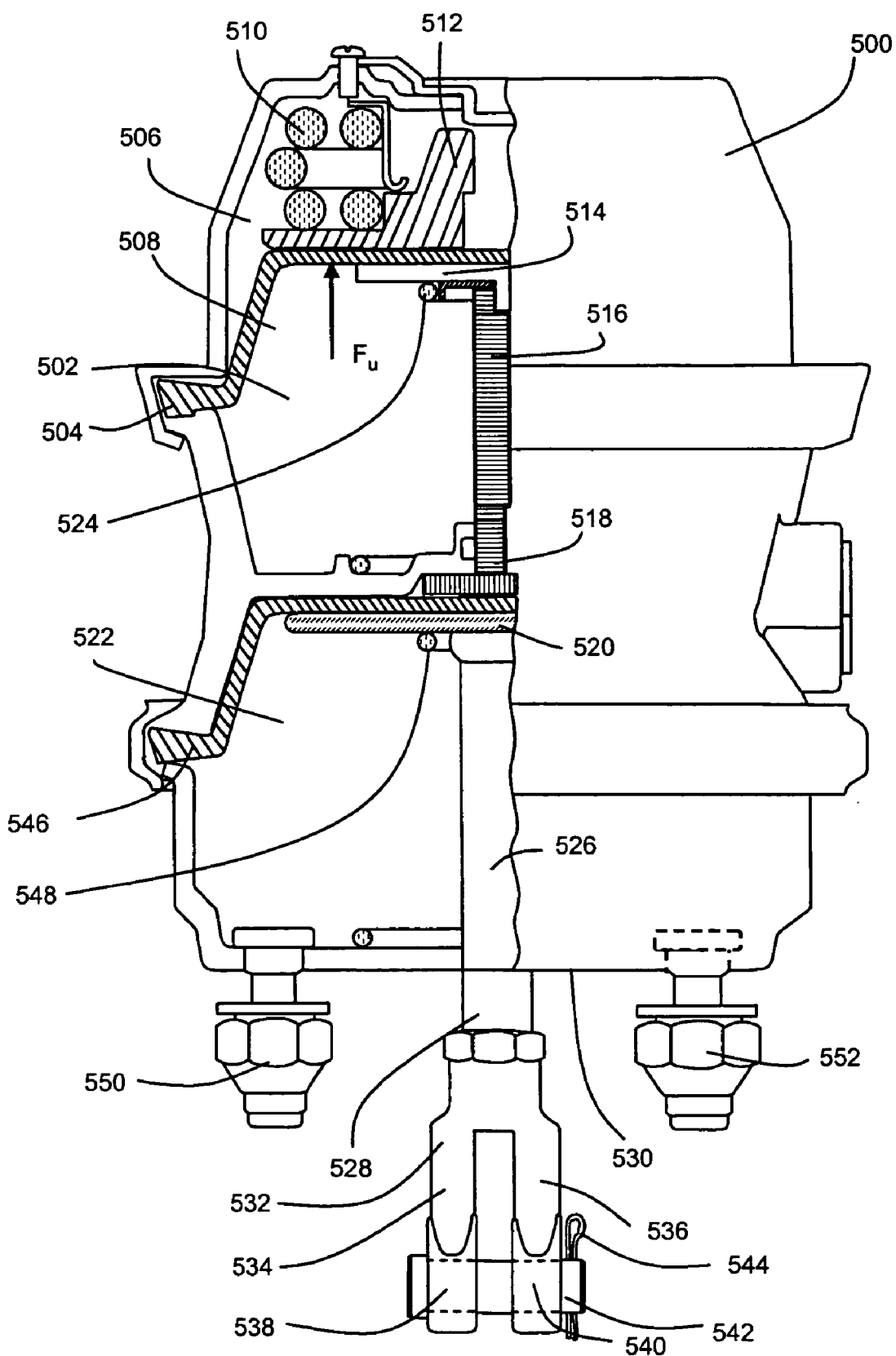
FIG. 5 is a partially cut away view of a two chamber air reservoir, according to an embodiment.

In one embodiment, at least one of the air reservoirs 126, 138 of apparatus 100 may be a multi-chamber air reservoir 500, as shown in FIG. 5. The advantages of such an air reservoir are discussed below. As shown, air reservoir 500 includes a first, or spring, chamber 502. Spring chamber 502 is partitioned by a movable diaphragm 504 which maintains a fluid-tight seal between an upper portion 506 of spring chamber 502 and a lower portion 508.

Upper portion 506 of spring chamber 502 includes a power spring 510 in contact with a piston 512. In FIG. 5, power spring 510 is shown in a substantially contracted configuration. Power spring 510 remains contracted so long as lower portion 508 of spring chamber 502 is pressurized with an adequate supply of a fluid such as compressed air. A sufficiently pressurized lower portion 508 creates a force "$F_u$" pushing "upward" on diaphragm 504 and piston 512, thereby contracting power spring 510.

Lower portion 508 of spring chamber 502 contains a push-rod plate 514 in contact with a push rod 516. Push rod plate 514 may be referred to as a "spring side push rod plate." One end 518 of push rod 516 is in close proximity to a second push rod plate 520, often referred to as the "service side push rod plate." As can be seen in FIG. 5, the second or service side push rod plate 520 is actually positioned in a second chamber 522 of air reservoir 500, often referred to as the "service" chamber 522. Spring chamber 502 further includes a return spring 524 to assist with maintaining the position of the spring side push rod plate 514.

Referring once again to service chamber 522, push rod plate 520 contacts an extendable and retractable piston rod 526. Piston rod 526 is analogous for example to piston rod 128 discussed above. One end 528 of piston rod 526, the end positioned outside an outer surface 530 of air reservoir 500, includes a linkage assembly 532 that connects piston rod 526 to bell crank 134. For example, linkage assembly 532 may include two extensions 534, 536 having apertures 538, 540 for receipt of a dowel 542 having a cotter pin 544. This linkage assembly 532, however, is just one of any number of assemblies or devices that may be used to connect piston rod 526 to bell crank 134.

A second movable diaphragm 546 is positioned in service chamber 522. The second diaphragm 546 facilitates pressurization of service chamber 522 under certain circumstances so as to exert a downward pressure "$F_d$" (FIG. 6) on pushrod plate 520. As with the spring chamber 502, service chamber 522 includes a return spring 548 that maintains the position of diaphragm 546 and push rod plate 520 when the service chamber 522 is not pressurized and power spring 510 is contracted.

Two mounting bolts 550, 552 are shown in FIG. 5. Mounting bolts 550, 552 may be used to mount air reservoir 500 to a bracket, such as bracket 218 in FIG. 2. It can be appreciated that other attachment mechanisms known in the art may be used to mount air reservoir 500 to axle subassembly 102.

In operation, as discussed above, bell crank 134 rotates through a concerted pressurizing and exhausting of air reservoirs. e.g., air reservoirs 126, 138. More specifically, when air reservoir 126 is pressurized, and piston rod 128 is extended to rotate bell crank 134 rearward, air reservoir 138 is exhausted or de-pressurized. In this configuration, piston rod 200 retracts and air reservoir 138 serves as a locking device to fix bell crank 134 in place, thereby maintaining a "+θ" caster angle. Alternatively, when air reservoir 138 is pressurized, and piston rod 200 extends to rotate bell crank 134 forward, air reservoir 126 is exhausted. In this instance, air reservoir 126 acts as the locking device to maintain a "−θ" caster angle.

Figure 6:
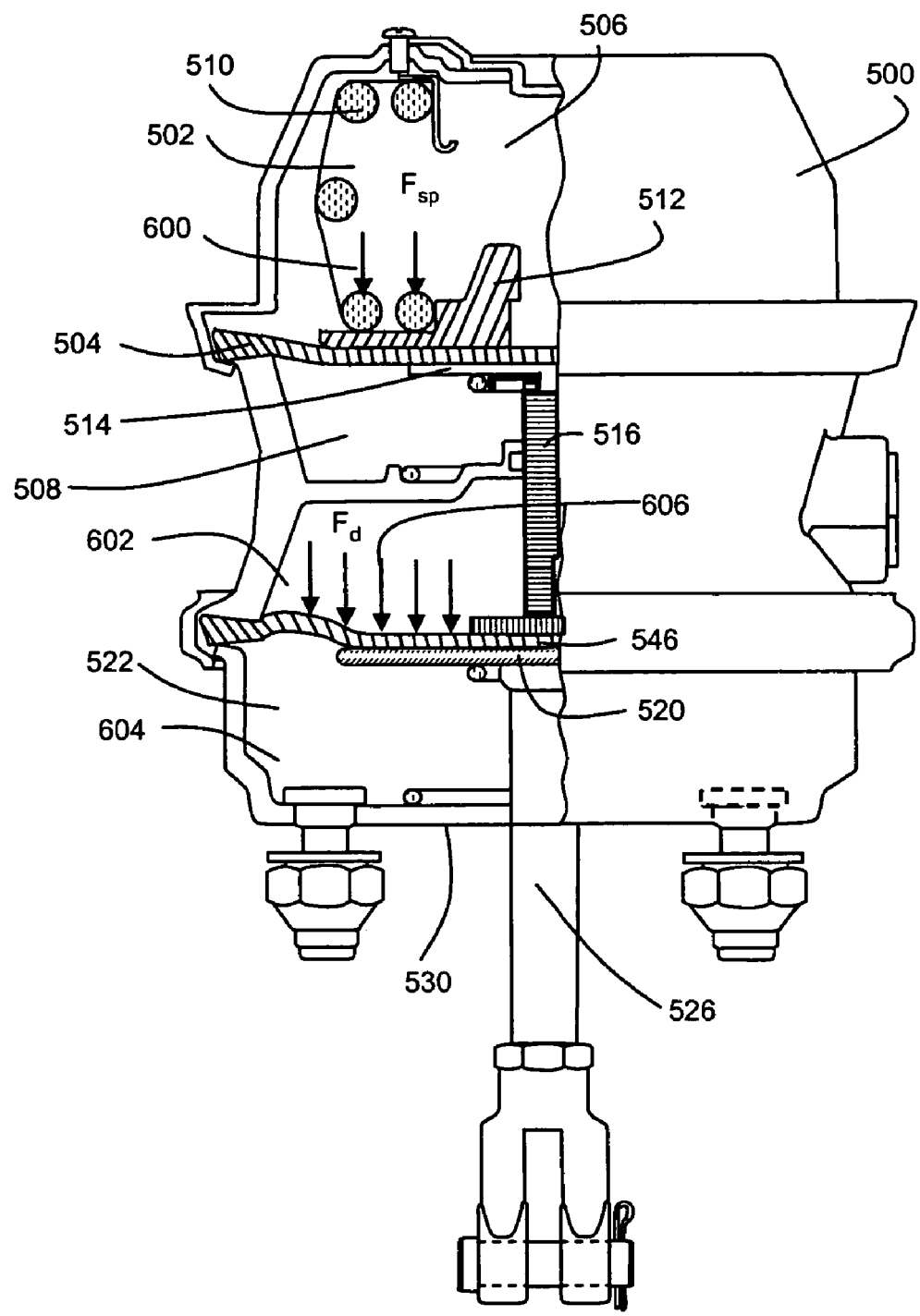
FIG. 6 is a partially cut away view of a two chamber air reservoir with an extended piston rod, according to an embodiment.

In at least one embodiment, one air reservoir is of the type shown in FIG. 5, i.e., air reservoir 500. In this configuration, air reservoir 500 may act to effectively increase the force available to establish and maintain a caster angle. Referring now to FIG. 6, air reservoir 500 is shown with piston rod 526 extended, such as during use. Initially, lower portion 508 of spring chamber 502 is exhausted, reducing the fluid pressure required to maintain power spring 510 in a contracted position. As shown, as power spring 510 extends piston 512 moves toward outer surface 530 under the force "$F_{sp}$" of this extension (shown by arrows 600). Piston 512 also simultaneously pushes diaphragm 504 further into spring chamber 502. At all times, diaphragm 504 maintains a fluid tight seal between the upper portion 506 and the lower portion 508 of spring chamber 502.

The movement of piston rod 512 also forces pushrod plate 514 and pushrod 516 to move toward outer surface 530. This movement generates a force on pushrod plate 520, which in turn pushes on piston rod 526, thereby extending piston rod 526 further outside air reservoir 500. Simultaneously, diaphragm 546 moves within service chamber 522 while maintaining a fluid tight seal between an upper portion 602 and lower portion 604 of service chamber 522.

Contemporaneous with the extension of piston 526, upper portion 602 of service chamber 522 may be pressurized with a fluid to exert an additional force $F_d$, as represented by arrows 606, on pushrod plate 520. This additional force is additive with the mechanical force produced by the extension of power spring 510. As such, the force generated to move and extend piston rod 526 is increased. In at least one embodiment, the force generated is doubled. The increased force helps to ensure that a positive caster angle "+θ" is established and maintained; it may further help overcome the frictional forces inherent in axle subassembly 102, and in the wheel-to-driving surface contact, thereby making it easier to establish and maintain the desired caster angle.

Changes may be made in the above methods, devices and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, device and structure, which, as a matter of language, might be said to fall therebetween.

What is claimed is:

1. An apparatus for establishing a caster angle of a vehicle suspension system comprising:
    a bell crank pivotally connected to a control arm of an axle subassembly;
    a first air reservoir coupled to the bell crank; and
    a second air reservoir coupled to the bell crank, the first and second air reservoirs being juxtaposed;
    wherein the first and the second air reservoirs are concertedly pressurized and exhausted to rotate the bell crank, and wherein rotation of the bell crank induces movement of the control arm to establish the caster angle.

2. The apparatus of claim 1, wherein pressurizing the first air reservoir and exhausting the second air reservoir establishes a positive caster angle, and further wherein pressurizing the second air reservoir and exhausting the first air reservoir establishes a negative caster angle.

3. The apparatus of claim 1,
    wherein the first air reservoir comprises:
        a first chamber;
        a second chamber;
        a power spring positioned in the first chamber; and
        an extendable piston rod having a first end positioned within the second chamber and a second end positioned outside the second chamber, the second end of the piston rod having a linkage mechanism connecting the piston rod to the bell crank,
    wherein extension of the power spring exerts a force on the piston rod to extend a length of the piston rod outside the second chamber and rotate the bell crank.

4. The apparatus of claim 3, further comprising a pressurized fluid introduced into the first chamber, to pressurize the first chamber and contract the power spring, wherein contraction of the power spring retracts the piston rod.

5. The apparatus of claim 4, wherein the pressurized fluid is compressed air.

6. The apparatus of claim 3, wherein a total force exerted on the piston rod, to extend the piston rod, is equal to a combination of a first force generated as the power spring extends, and a second force generated by introducing a pressurized fluid into the second chamber.

7. An apparatus for establishing a caster angle of a vehicle suspension system comprising:
    an axle subassembly having an axle;
    at least one hanger bracket interconnecting the axle subassembly to a chassis of the vehicle;
    a bell crank;
    a control arm having a first end pivotally connected to the bell crank and a second end connected to the axle subassembly;
    a first air reservoir having a first piston rod pivotally connected to the bell crank; and
    a second air reservoir having a second piston rod pivotally connected to the bell crank, the first and second air reservoirs being juxtaposed;
    wherein concerted pressurizing and exhausting of the first and the second air reservoirs induces a corresponding extension and retraction of the first and second piston rods to rotate the bell crank, and wherein rotation of the bell crank induces a corresponding movement of the control arm and axle to establish the caster angle.

8. The apparatus of claim 7, wherein a positive caster angle is established by pressurizing the first air reservoir and exhausting the second air reservoir, and wherein a negative caster angle is established by pressurizing the second air reservoir and exhausting the first air reservoir.

9. The apparatus of claim 7,
wherein the first air reservoir further comprises:
a first chamber;
a second chamber; and
a power spring positioned in the first chamber to extend the first piston rod,
wherein extension of the power spring exerts a force on the first piston rod to extend a length of the first piston rod outside the second chamber and rotate the bell crank.

10. The apparatus of claim 9, wherein a pressurized fluid is introduced into the first chamber to pressurize the first chamber and contract the power spring, and wherein contraction of the power spring retracts the first piston rod.

11. The apparatus of claim 10, wherein the pressurized fluid is compressed air.

12. The apparatus of claim 9, wherein a total force exerted on the first piston rod, to extend the first piston rod, is equal to a combination of a first force generated as the power spring extends, and a second force generated by introducing a pressurized fluid into the second chamber.

13. A method for establishing a caster angle of a vehicle suspension system, comprising:
pressurizing and exhausting a first air reservoir to extend and retract, respectively, a first piston rod having a first end positioned within the first air reservoir and a second end pivotally attached to a bell crank; and
pressurizing and exhausting a second air reservoir, in concert with the first air reservoir, to extend and retract, respectively, a second piston rod having a first end positioned within the second air reservoir and a second end pivotally attached to the bell crank, the first and second air reservoirs being juxtaposed;
wherein concertedly pressurizing and exhausting the first and the second air reservoirs induces a rotation of the bell crank, and a subsequent rotation of an axle of the vehicle suspension system to establish the caster angle.

14. The method of claim 13, wherein pressurizing the first air reservoir and exhausting the second air reservoir establishes a positive caster angle, and further wherein exhausting the first air reservoir and pressurizing the second air reservoir establishes a negative caster angle.

15. The method of claim 13, wherein selectively pressurizing and exhausting the first and the second air reservoirs locks the bell crank in an established position, thereby maintaining an established caster angle.

16. The method of claim 13, further comprising:
concertedly pressurizing and exhausting a first chamber and a second chamber of the first air reservoir; and
extending or contracting a power spring positioned in the first chamber to induce a corresponding extension or retraction, respectively, of the first piston rod, thereby rotating the bell crank.

17. The method of claim 16, further comprising introducing a pressurized fluid into the first chamber to pressurize the first chamber and contract the power spring.

18. The method of claim 16, further comprising introducing a pressurized fluid into the second chamber.

19. The method of claim 18, further comprising combining a first force generated as the power spring extends with a second force generated by introducing the pressurized fluid into the second chamber, to extend the first piston rod.

* * * * *